(12) United States Patent
Iida et al.

(10) Patent No.: US 10,281,001 B2
(45) Date of Patent: May 7, 2019

(54) DAMPER APPARATUS, AND LOCK-UP APPARATUS FOR TORQUE CONVERTER

(71) Applicant: EXEDY Corporation, Neyagawa-shi, Osaka (JP)

(72) Inventors: Ryosuke Iida, Neyagawa (JP); Keisuke Kishihara, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 256 days.

(21) Appl. No.: 15/414,185

(22) Filed: Jan. 24, 2017

(65) Prior Publication Data

US 2017/0227085 A1     Aug. 10, 2017

(30) Foreign Application Priority Data

Feb. 5, 2016   (JP) .................. 2016-020607

(51) Int. Cl.
*F16F 15/121*   (2006.01)
*F16F 15/123*   (2006.01)
*F16H 45/02*    (2006.01)

(52) U.S. Cl.
CPC .... *F16F 15/1232* (2013.01); *F16F 15/12326* (2013.01); *F16F 15/12346* (2013.01); *F16H 45/02* (2013.01); *F16H 2045/0221* (2013.01); *F16H 2045/0284* (2013.01)

(58) Field of Classification Search
CPC ............. F16F 15/1232; F16F 15/12346; F16F 15/12326; F16H 45/02; F16H 2045/0284; F16H 2045/0221

USPC ................................ 464/67.1, 68.9; 192/203
See application file for complete search history.

(56) References Cited

U.S. PATENT DOCUMENTS 5,562,542 A *  10/1996  Rohrle .............. F16F 15/13438
5,882,264 A *   3/1999  Yabe ........................ F16D 49/02
                                                             192/203
7,297,064 B2 * 11/2007  Jackel ........................ F16F 1/08
                                                             464/67.1

FOREIGN PATENT DOCUMENTS

JP           2005188662 A     7/2005

* cited by examiner

*Primary Examiner* — Greg Binda
(74) *Attorney, Agent, or Firm* — United IP Counselors, LLC

(57) ABSTRACT

A damper apparatus includes a drive plate, a driven plate, torsion springs, and spring housing portions. The torsion springs each have a large arc spring and a small arc spring, and elastically couple the drive plate and the driven plate in the rotation direction and transmit torque. The spring housing portions have a support surface that can support the outer periphery of the large arc springs, and the support surface comes into contact with the outer periphery of the central portions, in the lengthwise direction, of the large arc springs. Also, gaps exist between the support surface and the outer periphery of the two end portions, in the lengthwise direction, of the large arc springs.

12 Claims, 6 Drawing Sheets

DAMPER APPARATUS, AND LOCK-UP APPARATUS FOR TORQUE CONVERTER

CROSS-REFERENCE TO RELATED APPLICATIONS

This application claims priority to Japanese Patent Application No. 2016-020607, filed Feb. 5, 2016. The contents of Japanese Patent Application No. 2016-020607 are herein incorporated by reference in their entirety.

BACKGROUND

Technical Field

The present disclosure relates to a damper apparatus, and to a lock-up apparatus in a torque converter that has the damper apparatus.

Description of the Related Art

Torque converters are often provided with a lock-up apparatus for directly transmitting torque from a front cover to a turbine. The lock-up apparatus has a backup ring, a clutch plate, and a damper apparatus arranged between a piston and the turbine.

The damper apparatus is an apparatus for absorbing and attenuating fluctuations in transmitted torque. The damper apparatus has a drive plate that is fixed to the piston, a driven plate that is fixed to the turbine, and a plurality of torsion springs, for example. The torsion springs elastically couple the drive plate and the driven plate in the rotation direction.

Japanese Patent Publication No. 2005-188662A discloses a lock-up apparatus that employs arc springs as the torsion springs. Each arc spring is held by a spring holding unit. A gap is formed between the arc spring and the portion of the spring holding unit that faces the outer periphery of the arc spring. Due to this gap, even when the arc spring undergoes deformation in which the central portion of the arc spring bulges outward during torque transmission, contact between the arc spring and the spring holding unit is avoided, and hysteresis torque is suppressed during torque transmission.

With the lock-up apparatus disclosed in Japanese Patent Publication No. 2005-188662A, it is possible to suppress hysteresis torque when the arc spring contracts.

However, Japanese Patent Publication No. 2005-188662A gives no consideration whatsoever to rotational speed, that is to say centrifugal force that acts on the spring.

BRIEF SUMMARY

An object of the present disclosure is to suppress an increase in hysteresis torque caused by centrifugal force that acts on a torsion spring.

(1) A damper apparatus according to one aspect of the present disclosure includes an input-side rotation member, an output-side rotation member, a plurality of arc springs, and a support member. Torque is input to the input-side rotation member. The output-side rotation member is rotatable relative to the input-side rotation member and outputs torque. The arc springs are arc-shaped in a free state, and elastically couple the input-side rotation member and the output-side rotation member in a rotation direction and transmit torque. The support member has a support surface capable of supporting an outer periphery of the arc springs, and is arranged on an outer circumferential side of the arc springs. An outer periphery of a central portion, in a lengthwise direction, of at least one arc spring among the plurality of arc springs comes into contact with the support surface of the support member. Also, gaps are formed between the support surface and an outer periphery of two end portions, in the lengthwise direction, of the at least one arc spring.

Note that the term "arc-shaped" is not intended to be limited to a shape that has a constant radius of curvature.

According to the above apparatus, when torque is input to the input-side rotation member, the input torque is transmitted to the output-side rotation member via the arc springs and then output. Here, the arc springs are supported by the support member, and in the non-rotating state, the support surface of the support member is in contact with the outer periphery of the central portion, in the lengthwise direction (circumferential direction), of at least one of the arc springs. However, gaps exist between the support surface and the outer periphery of the two end portions, in the lengthwise direction, of the arc spring, and therefore even if the arc spring is subjected to centrifugal force, and the two end portions in the lengthwise direction undergo elastic deformation to the outer circumferential side, the contact load between the support surface and those portions is reduced. For this reason, it is possible to reduce hysteresis torque.

(2) A damper apparatus according to another aspect of the present disclosure includes an input-side rotation member, an output-side rotation member, a plurality of arc springs, and a support member. Torque is input to the input-side rotation member. The output-side rotation member is rotatable relative to the input-side rotation member and outputs torque. The arc springs are arc-shaped in a free state, and elastically couple the input-side rotation member and the output-side rotation member in a rotation direction and transmit torque. The support member has a support surface capable of supporting an outer periphery of the arc springs, and is arranged on an outer circumferential side of the arc springs. The support surface of the support member has a first radius of curvature, and a second radius of curvature of an outer periphery of at least one arc spring that partially comes into contact with the support surface is smaller than the first radius of curvature.

(3) It is preferable that gaps between the support surface of the support member and an outer periphery of at least one arc spring that partially comes into contact with the support surface are widest at two ends in the lengthwise direction, and become increasingly narrow toward a center in the lengthwise direction.

(4) It is preferable that the support member is formed on an outer circumferential portion of the input-side rotation member or the output-side rotation member, and is integrated with the input-side rotation member or the output-side rotation member.

(5) It is preferable that the plurality of arc springs each have a first spring and a second spring that is housed inside the first spring.

(6) It is preferable that the support member is ring-shaped and has housing portions that have a C-shaped cross-section and house the plurality of arc springs, the first springs have a first coil length, and the second springs have a second coil length that is shorter than the first coil length, and have the same radius of curvature as the housing portions of the support member.

(7) It is preferable that the first springs and the second springs have the same coil length and the same radius of curvature.

(8) A lock-up apparatus in a torque converter according to another aspect of the present disclosure is arranged between a front cover to which torque from an engine is input and a turbine that outputs torque to a transmission. The lock-up apparatus includes a clutch portion to which torque is input from the front cover; and the above-described damper apparatus that is arranged between the clutch portion and the turbine.

DETAILED DESCRIPTION

Figure 1:
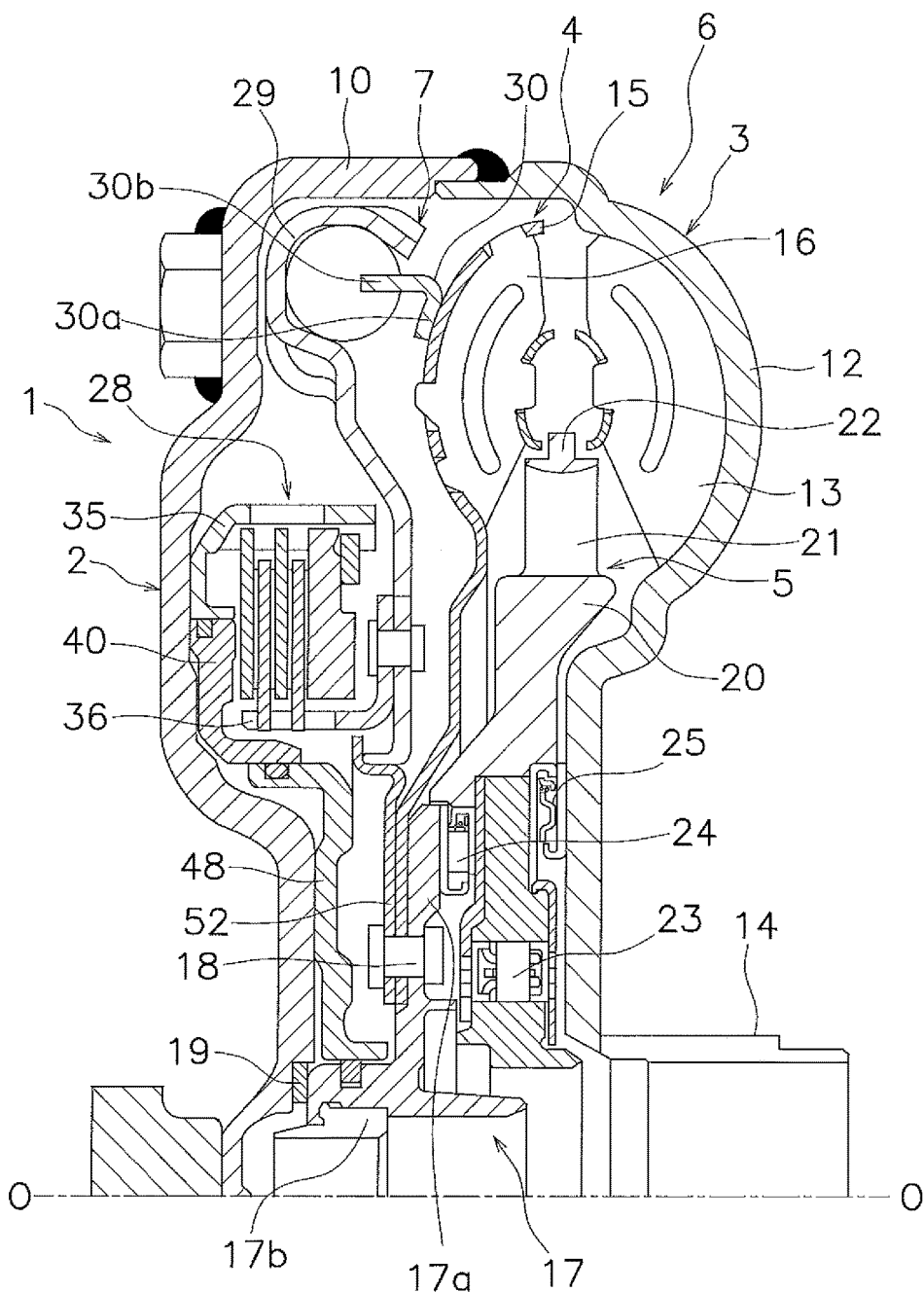
FIG. 1 is a cross-sectional diagram of a torque converter that includes a damper apparatus according to an embodiment of the present disclosure.

FIG. 1 is a cross-sectional view of a portion of a torque converter 1 that has a lock-up apparatus according to an embodiment of the present disclosure. In FIG. 1, an engine (not shown) is arranged on the left side, and a transmission (not shown) is arranged on the right side. Note that O—O shown in FIG. 1 indicates the rotation axis of the torque converter and the lock-up apparatus.

Overall Configuration of Torque Converter 1

The torque converter 1 is an apparatus for transmitting torque from a crankshaft (not shown) on the engine side to a transmission input shaft (not shown), and is constituted by a front cover 2 that is fixed to an input-side member coupled to the crankshaft, a torque converter main body 6 made up of three types of impellers (an impeller 3, a turbine 4, and a stator 5), and a lock-up apparatus 7.

The front cover 2 is a disk-shaped member, and the outer circumferential portion thereof is provided with an outer circumferential tubular portion 10 that protrudes toward the transmission. The impeller 3 is constituted by an impeller shell 12 that is fixed to the outer circumferential tubular portion 10 of the front cover 2 by welding, impeller blades 13 that are fixed to the inner side of the impeller shell 12, and a tubular impeller hub 14 that is formed on the inner circumferential side of the impeller shell 12.

The turbine 4 is arranged so as to face the impeller 3 in the fluid chamber. The turbine 4 is constituted by a turbine shell 15, turbine blades 16 that are fixed to the turbine shell 15, and a turbine hub 17 that is fixed to the inner circumferential side of the turbine shell 15. The turbine hub 17 has a flange 17a that extends toward the outer circumferential side, and a tubular portion 17b that extends toward the front cover 2 in the axial direction. The inner circumferential portion of the turbine shell 15 is fixed to the flange 17a by rivets 18. Also, the transmission input shaft (not shown) can undergo spline engagement with the inner circumferential portion of the turbine hub 17. Note that a thrust washer 19 is arranged between the front cover 2 and the engine-side tip surface of the tubular portion 17b.

The stator 5 is arranged between the impeller 3 and the inner circumferential portion of the turbine 4, and is a mechanism for rectifying the flow of hydraulic oil returning from the turbine 4 to the impeller 3. The stator 5 mainly has a stator carrier 20, stator blades 21 that are provided on the outer circumferential surface of the stator carrier 20, and a ring-shaped stator core 22 that is provided on the outer circumferential edge of the stator blades 21. The stator carrier 20 is supported to a fixing shaft (not shown) via a one-way clutch 23. Note that thrust bearings 24 and 25 are provided on the two sides, in the axial direction, of the inner circumferential portion of the stator carrier 20.

Lock-Up Apparatus 7

Figure 2:
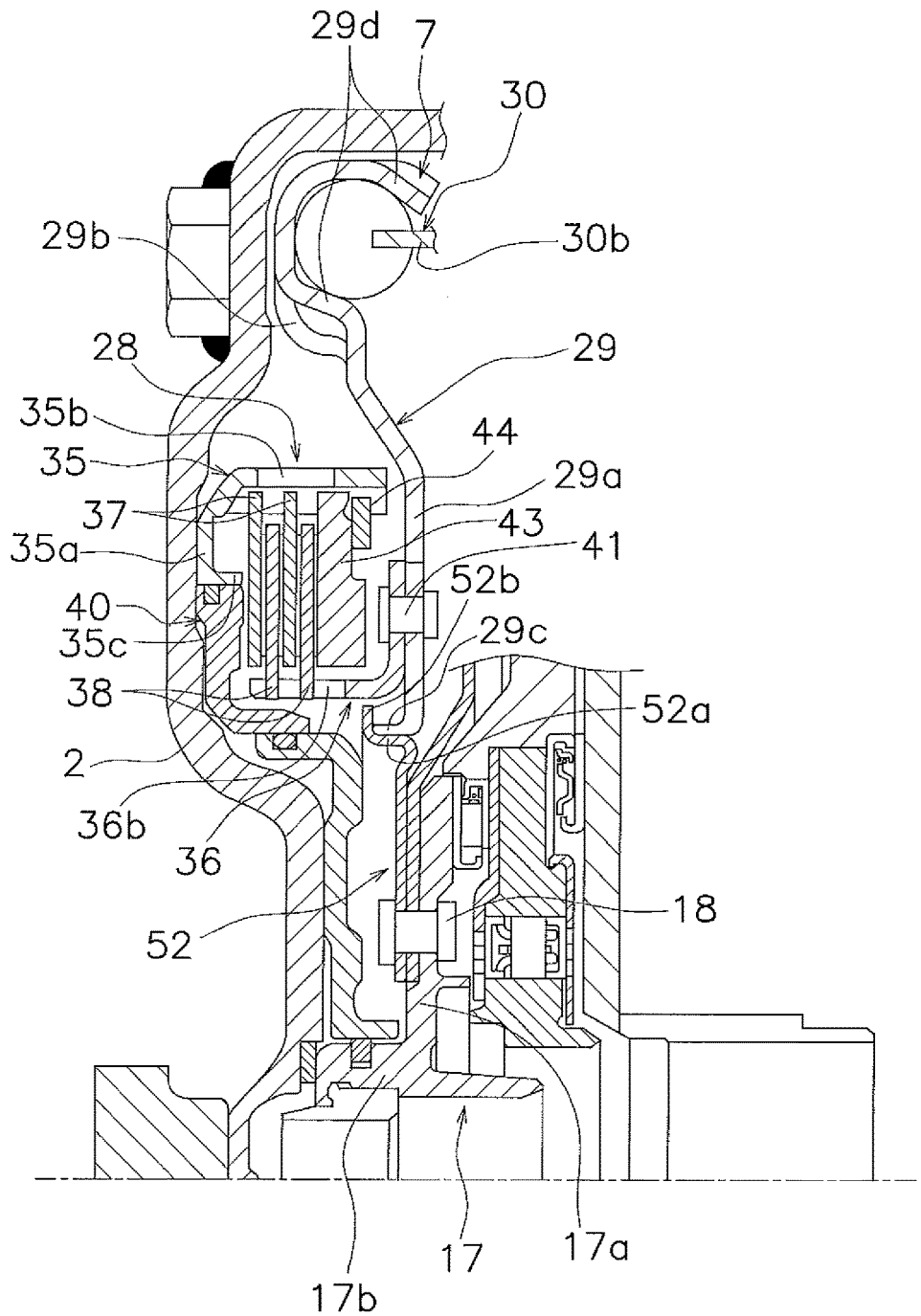
FIG. 2 is a diagram in which the lock-up apparatus in FIG. 1 has been extracted.

FIG. 2 is a diagram in which the lock-up apparatus 7 in FIG. 1 has been extracted. The lock-up apparatus 7 directly transmits torque from the front cover 2 to the turbine 4. The lock-up apparatus 7 includes a clutch portion 28 that is arranged between the front cover 2 and the turbine 4, a drive plate (input-side rotation member) 29 that transmits torque from the clutch portion 28 to the turbine 4, a driven plate 30 (output-side rotation member), and torsion springs 31.

Clutch Portion 28

The clutch portion 28 is a hydraulic action type of multi-plate clutch, and transmits torque from the front cover 2 to the drive plate 29 or cuts off the transmission of torque between the front cover 2 and the drive plate 29. As shown in FIG. 2, the clutch portion 28 has a clutch input member 35, a clutch output member 36, two first clutch plates 37, two second clutch plates 38, and a piston 40.

Clutch Input Member 35

The clutch input member 35 is ring-shaped, and has a disk-shaped fixing portion 35a, an outer tubular portion 35b, and an inner tubular portion 35c. The fixing portion 35a is fixed to the surface of the front cover 2 on the turbine 4 side by welding. The outer tubular portion 35b is formed so as to extend from the outer circumferential edge of the fixing portion 35a toward the turbine 4, and a plurality of recession and protrusion portions that extend in the axial direction are formed on the inner circumferential surface of the outer tubular portion 35b with predetermined gaps therebetween in the circumferential direction. The inner tubular portion 35c is formed so as to extend from the inner circumferential edge of the fixing portion 35a toward the turbine 4.

Clutch Output Member 36

The clutch output member 36 is ring-shaped and has a disk portion 36a that is shaped as a disk, and a tubular portion 36b that is formed so as to extend from the inner circumferential edge portion of the disk portion 36a toward the front cover 2. The disk portion 36a is fixed to the inner circumferential portion of the drive plate 29 by rivets 41. A plurality of notches that extend in the axial direction are formed in the tubular portion 36b with predetermined gaps in the circumferential direction.

First and Second Clutch Plates 37, 38

The first clutch plates 37 are ring-shaped. A plurality of teeth for engaging with the recession and protrusion portions of the outer tubular portion 35b of the clutch input member 35 are formed on the outer circumferential edges of the first clutch plates 37. According to this configuration, the first clutch plates 37 are capable of axial movement relative to the clutch input member 35, and nonrotatable relative to the clutch input member 35.

The second clutch plates 38 are ring-shaped. A plurality of teeth for engaging with the notches in the tubular portion 36b of the clutch output member 36 are formed on the inner circumferential edges of the second clutch plates 38. According to this configuration, the second clutch plates 38 are capable of axial movement relative to the clutch output member 36, and nonrotatable relative to the clutch output member 36. Also, ring-shaped friction members are fixed to the two surfaces of each of the second clutch plates 38.

A ring-shaped backup ring 43 is provided on the turbine 4 side of one of the two second clutch plates 38, namely the second clutch plate 38 that is located on the turbine 4 side. A plurality of teeth for engaging with the recession and protrusion portions of the outer tubular portion 35b of the clutch input member 35 are formed on the outer circumferential edge of the backup ring 43. According to this configuration, the backup ring 43 is capable of axial movement relative to the clutch input member 35, and nonrotatable relative to the clutch input member 35. Note that a snap ring 44 for restricting movement of the backup ring 43 toward the turbine 4 is provided on the turbine 4 side of the backup ring 43. The snap ring 44 engages with a ring-shaped groove formed in the outer tubular portion 35b of the clutch input member 35.

Piston 40

Figure 3:
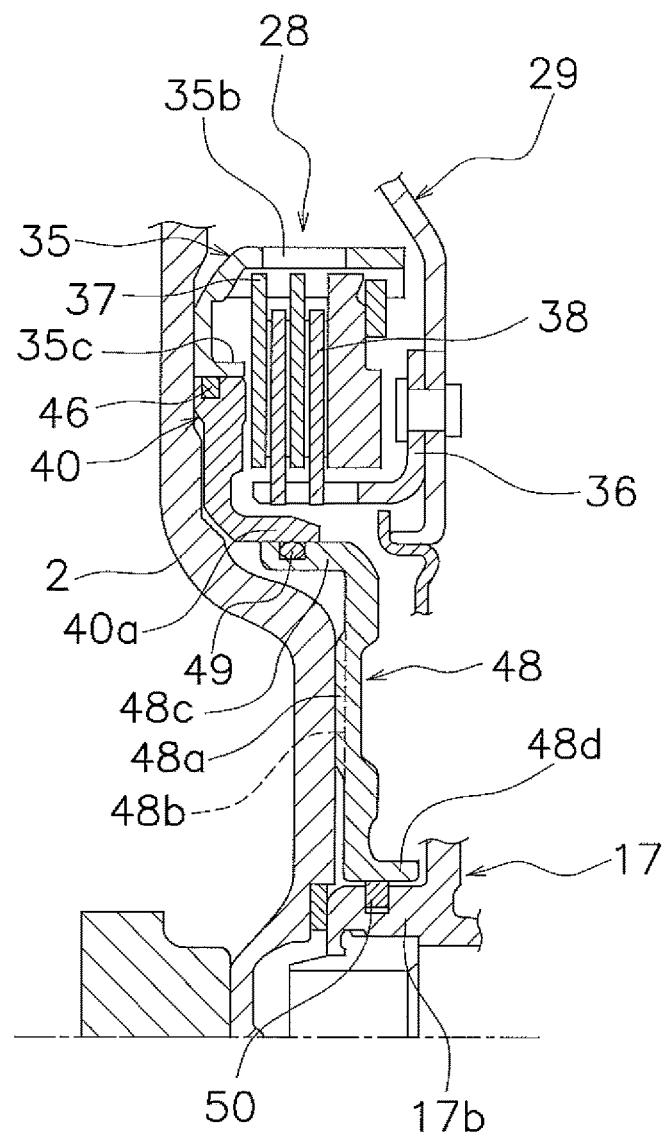
FIG. 3 is a diagram in which a clutch portion in FIG. 1 has been extracted.

FIG. 3 shows an enlargement of a portion related to the piston 40. The piston 40 is arranged between the front cover 2 and the first and second clutch plates 37 and 38 on the inner circumferential side of the clutch input member 35. The piston 40 is ring-shaped and supported such that the outer circumferential surface thereof can slide against the inner circumferential surface of the inner tubular portion 35c of the clutch input member 35. A seal member 46 is provided on the outer circumferential surface of the piston 40, thus sealing off the piston 40 from the clutch input member 35. Also, a tubular portion 40a that extends toward the turbine 4 is formed on the inner circumferential edge portion of the piston 40. The tubular portion 40a of the piston 40 is supported such that the inner circumferential surface thereof can slide against a piston support member 48.

As shown in FIGS. 1 to 3, the piston support member 48 is a member that is ring-shaped and disk-shaped. Protrusion portions 48a that protrude toward the front cover 2 and extend in the diameter direction are formed on the piston support member 48 at locations in the circumferential direction. The protrusion portions 48a are fixed to the front cover 2 by welding. Note that although FIGS. 1 to 3 show a portion in which the piston support member 48 is fixed to the front cover 2, portions of the piston support member 48 that are not fixed to the front cover 2 form grooves 48b that extend in the diameter direction (shown by a broken line in FIG. 3). Hydraulic oil is supplied from the inner circumferential side to the space between the piston 40 and the front cover 2 via the grooves 48b.

An outer tubular portion 48c that extends toward the front cover 2 is formed on the outer circumferential edge portion of the piston support member 48, and an inner tubular portion 48d that extends toward the turbine 4 is formed on the inner circumferential edge portion. As previously described, the outer tubular portion 48c is the portion that supports the tubular portion 40a of the piston 40, and a seal member 49 is provided on the outer circumferential surface of the outer tubular portion 48c. The piston 40 is sealed off from the piston support member 48 by the seal member 49. Also, the inner tubular portion 48d is supported so as to be capable of sliding against the outer circumferential surface of the tubular portion 17b of the turbine hub 17. A seal member 50 is provided on the outer circumferential surface of the tubular portion 17b of the turbine hub 17. The piston support member 48 is thus sealed off from the turbine hub 17.

Drive Plate 29

As shown in FIG. 2 and the like, the drive plate 29 is ring-shaped, and has a disk portion 29a, spring housing portions 29b formed at the outer circumferential edge of the disk portion 29a, and a support portion 29c that extends toward the front cover 2 at the inner circumferential edge of the disk portion 29a. Note that the outer circumferential portion of the drive plate 29 (including the spring housing portions 29b) functions as a support member that is arranged on the outer circumferential side of the torsion springs 31. As previously described, the clutch output member 36 is fixed to the disk portion 29a by the rivets 41. The spring housing portions 29b have a C-shaped cross-section, house the torsion springs 31 therein, and support the inner circumferential sides of the torsion springs 31, the side portions on the front cover 2 side of the same, and the outer circumferential sides of the same. Engaging portions 29d that engage with the end surfaces of the torsion spring 31 are formed at the two ends, in the circumferential direction, of each of the spring housing portions 29b.

Also, a drive plate support member 52 is provided on the inner circumferential side of the drive plate 29. The drive plate support member 52 is ring-shaped, and the inner circumferential edge portion thereof is fixed to the turbine shell 15 and the flange 17a of the turbine hub 17 by the rivets 18.

A plate support portion 52a and a stopper portion 52b are formed on the outer circumferential portion of the drive plate support member 52. The plate support portion 52a is shaped as a tube that extends toward the front cover 2, and supports the inner circumferential surface of the support portion 29c of the drive plate 29. The stopper portion 52b is formed by bending the tip of the plate support portion 52a toward the outer circumferential side. The stopper portion 52b can abut against the axial tip of the support portion 29c of the drive plate 29, and restricts the drive plate 29 and members fixed to or supported by the drive plate 29 from moving toward the front cover 2.

Driven Plate 30

The driven plate 30 transmits torque received from the drive plate 29 via the torsion springs 31, to the turbine 4 (specifically the turbine shell 15). As shown in FIG. 1, the driven plate 30 has a fixing portion 30a that is fixed to the turbine shell 15, and a plurality of engaging portions 30b. The engaging portions 30b are formed by bending outer circumferential portions of the fixing portion 30a toward the front cover 2, and are arranged at equiangular intervals in the circumferential direction. The torsion springs 31 are arranged between adjacent engaging portions 30b in the circumferential direction.

Torsion Springs 31

Figure 4:
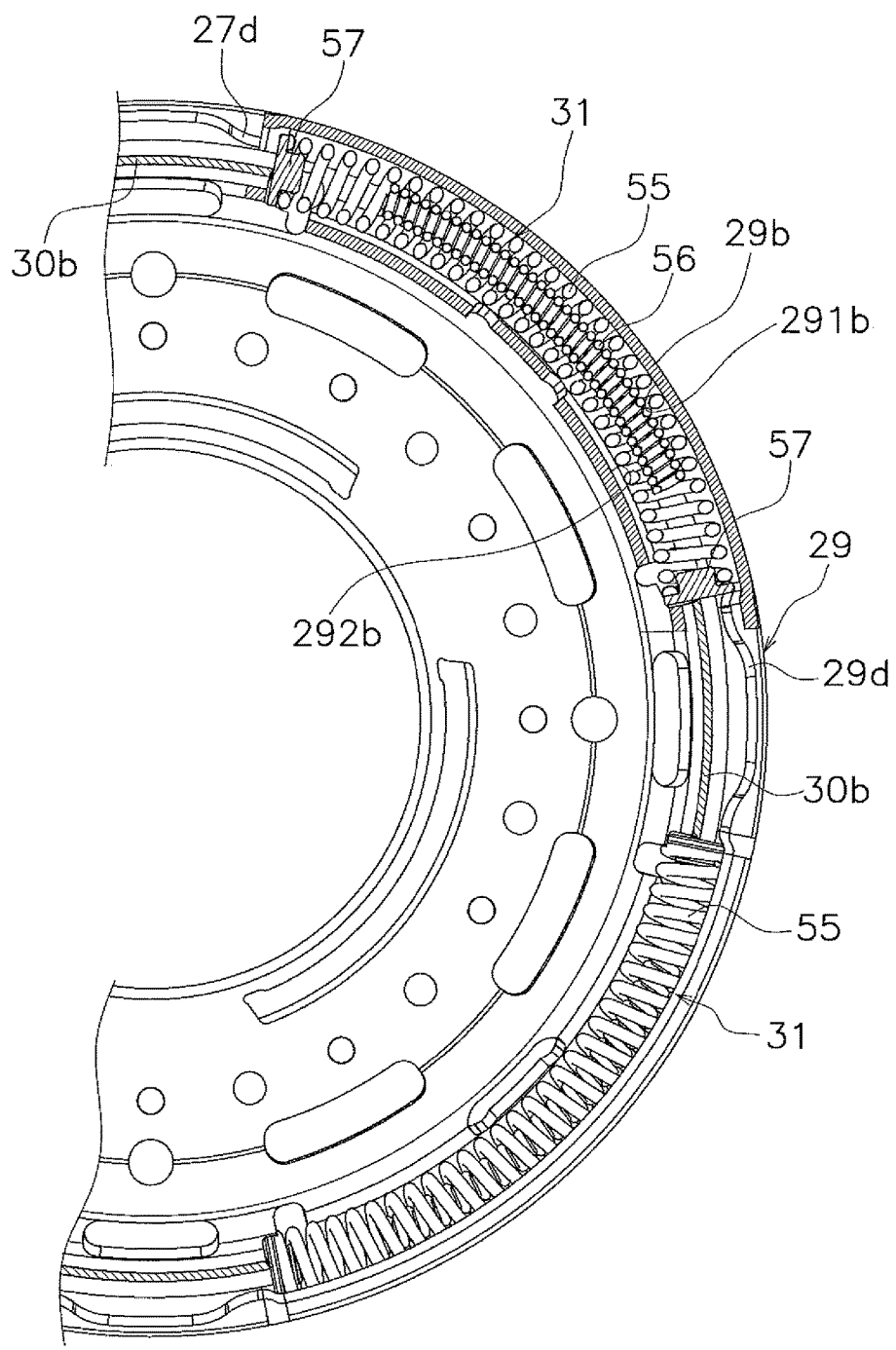
FIG. 4 is a partial front view of a portion of the lock-up apparatus in FIG. 1.

As shown in FIG. 4, the torsion springs 31 are each constituted by a large arc spring 55 and a small arc spring 56. Note that FIG. 4 shows the drive plate 29 with the torsion springs 31 incorporated therein, as viewed from the turbine 4 side.

Figure 5:
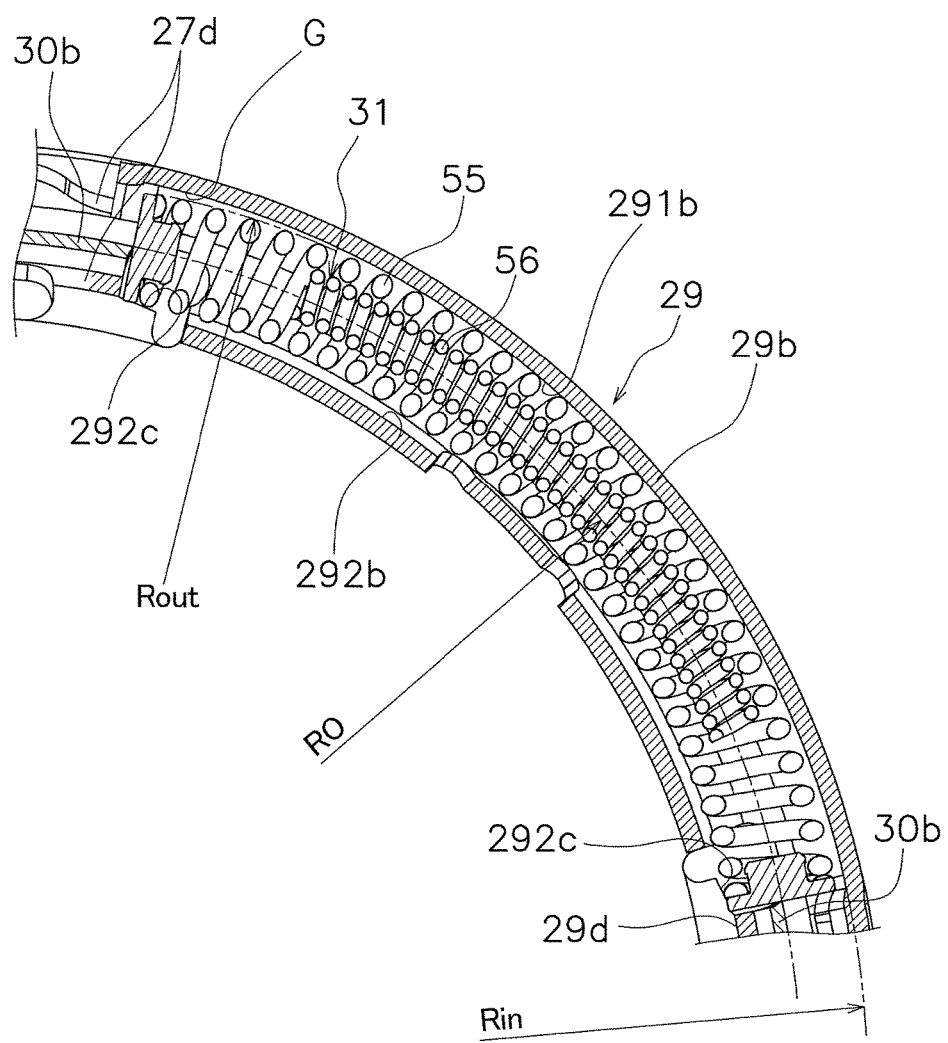
FIG. 5 is an enlarged view of a portion of FIG. 4.

As previously described, the torsion springs 31 are housed in the spring housing portions 29b of the drive plate 29. The spring housing portions 29b have a C-shaped cross-section, and have a support surface 291b that supports the outer circumferential surfaces of the large arc springs 55. As shown in FIGS. 4 and 5, the support surface 291b has a radius of curvature Rin. Note that the support surface 291b is formed on only the spring housing portions 29b. In other words, the support surface 291b is formed in an intermittent ring shape, and the engaging portions 29d are formed between adjacent portions of the support surface 291b in the circumferential direction.

Also, the spring housing portions 29b have a restricting surface 292b for restricting movement of the torsion springs 31 toward the inner circumferential side. Similarly to the support surface 291b, the restricting surface 292b is formed in an intermittent ring shape, and is formed over a smaller angular range than the support surface 291b. More specifically, the restricting surface 292b is not arranged on the inner circumferential side of the two end portions of the large arc springs 55 in the circumferential direction.

The large arc spring 55 is a coil spring that has a circular cross-section, and is formed so as to be arc-shaped in its free state. A pair of spring seats 57 are respectively attached to the two end portions of the large arc spring 55. The large arc spring 55 engages with the engaging portions 29*d* of the drive plate 29 via the spring seats 57. Note that as shown in FIG. 5, dropout prevention portions 292*c* are formed in portions of the restricting surface 292*b*, namely on the inner circumferential side of the spring seat 57 and on the inner circumferential side of the end portions of the large arc spring 55. Due to the dropout prevention portions 292*c* coming into contact with the spring seats 57 and the large arc spring 55 on the inner circumferential side, the spring seats 57 and the large arc spring 55 are prevented from dropping out to the inner circumferential side.

A radius of curvature Rout of the outer circumferential surface of the large arc spring 55 is set smaller than the radius of curvature Rin of the support surface 291*b*. Accordingly, when the large arc spring 55 has been set in the spring housing portion 29*b* (in a non-rotating state), the central portion, in the lengthwise direction (circumferential direction), of the outer circumferential surface of the large arc spring 55 comes into contact with the support surface 291*b*, whereas a gap G exists between the support surface 291*b* and the two end portions, in the circumferential direction, of the large arc spring 55. These gaps G are widest at two end portions and become narrower toward the center of the large arc spring 55 in the lengthwise direction.

Note that the reason why the radius of curvature Rout of the outer circumferential surface of the large arc spring 55 is set smaller than the radius of curvature Rin of the support surface 291*b* is to prevent an increase in hysteresis torque caused by the two end portions of the torsion spring 31 being forcefully brought into contact with the support surface 291*b* due to the torsion spring 31 undergoing elastic deformation due to centrifugal force when the lock-up apparatus rotates, as will be described later. For this reason, it is desirable that the relationship between the radius of curvature Rout of the outer circumferential surface of the large arc spring 55 and the radius of curvature Rin of the support surface 291*b* is Rin×0.7≤Rout≤Rin×0.9. If the radius of curvature Rout is greater than Rin×0.9, hysteresis torque cannot be effectively reduced. If the radius of curvature Rout is less than Rin×0.7, the two end portions of the large arc spring 55 in the circumferential direction are forcefully brought into contact with the restricting surface 292*b*, and it remains that hysteresis torque cannot be effectively reduced.

The small arc spring 56 is a coil spring that has a circular cross-section, is formed so as to be arc-shaped in its free state, and is housed inside the large arc spring 55. The coil length (length in the circumferential direction) of the small arc spring 56 is shorter than the coil length of the large arc spring 55. Also, the radius of curvature of the small arc spring 56 (specifically, the radius of curvature at the coil center of the small arc spring) is the same as a radius of curvature R0 of the spring housing portion 29*b* (specifically, the radius of curvature at the center of the C-shaped cross-section of the spring housing portion 29*b*).

Operation

When the engine rotational speed is in the low rotational speed region, the clutch portion 28 is in the off state, and lock-up is not implemented. When lock-up is not implemented, torque from the front cover 2 is transmitted from the impeller 3 to the turbine 4 via hydraulic fluid.

When the speed ratio of the torque converter 1 rises, and the engine rotational speed reaches a certain rotational speed, hydraulic fluid is supplied to the space between the piston 40 and the front cover 2. As a result, the piston 40 is moved toward the turbine 4, and the first clutch plate 37 and the second clutch plate 38 are pressed against each other. Accordingly, the clutch portion 28 enters the on state, and a lock-up state is entered. In the lock-up state, torque from the front cover 2 is transmitted from the clutch input member 35 to the drive plate 29 via the clutch plates 37 and 38 and the clutch output member 36. Furthermore, torque is transmitted from the drive plate 29 to the driven plate 30 via the torsion spring 31, and then transmitted to the turbine hub 17. In other words, the front cover 2 becomes mechanically coupled to the turbine hub 17, and torque from the front cover 2 is directly output to the transmission input shaft via the turbine 4.

In the above-described operations, the torsion springs 31 are subjected to centrifugal force. Accordingly, the outer circumferential surface of the large arc spring 55 that makes up part of the torsion spring 31 is pressed against the support surface 291*b* of the spring housing portion 29*b*. Here, gaps are formed between the support surface 291*b* and the two end portions of the large arc spring 55. For this reason, even if the large arc spring 55 is subjected to centrifugal force and the two end portions thereof undergo elastic deformation to the outer circumferential side, the contact load applied to the support surface 291*b* by the two end portions is smaller than that in a conventional structure in which no gap is formed. This therefore achieves a reduction in friction resistance (i.e., hysteresis torque) when the large arc spring 55 operates.

Figure 6:
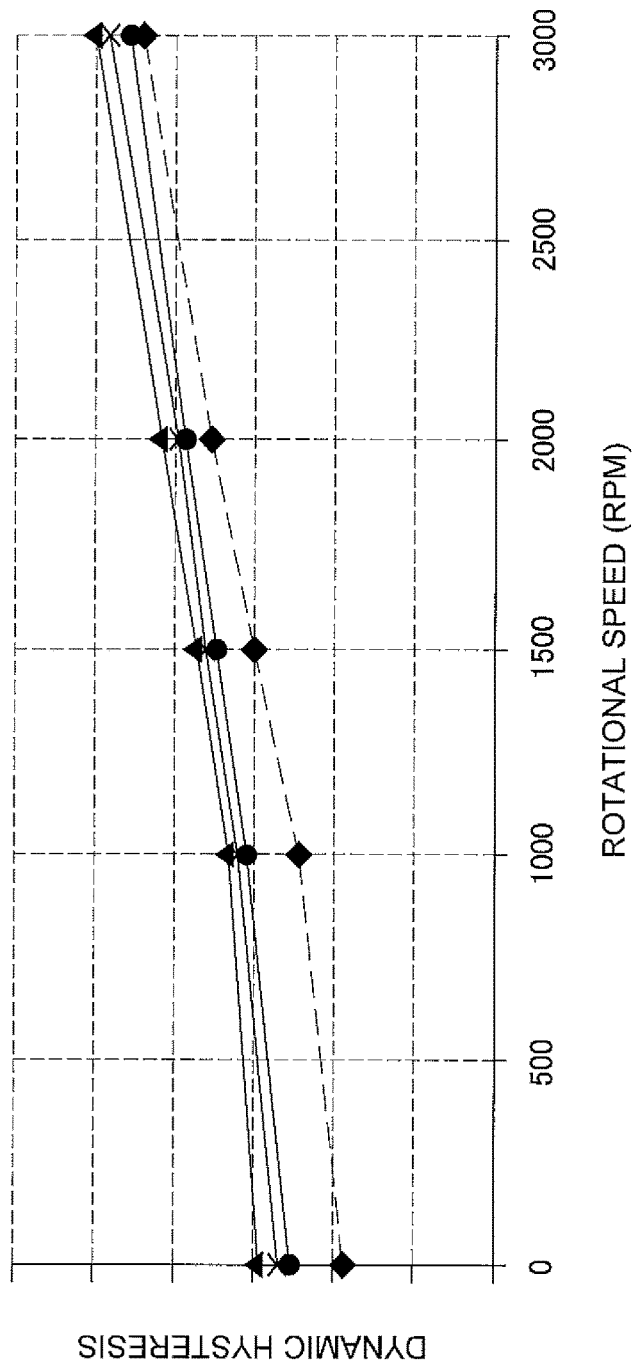
FIG. 6 is a diagram showing actions and effects of an embodiment of the present disclosure.

FIG. 6 shows a comparison of dynamic hysteresis torque in conventional structures in which the radius of curvature Rin of the support surface and the radius of curvature Rout of the outer circumferential surface of the large arc spring are the same (solid lines), and dynamic hysteresis torque in the present embodiment in which the radius of curvature Rout of the outer circumferential surface of the large arc spring is 10% smaller than the radius of curvature Rin of the support surface, that is to say Rout=Rin×0.9 (dashed line). It can be seen in FIG. 6 that at the rotational speed of 1500 rpm, the hysteresis torque is lower by approximately 15% in the present embodiment.

Other Embodiments

The present disclosure is not intended to be limited to the embodiment described above, and various modifications and alterations can be made without departing from the scope of the present disclosure.

(a) Although the present disclosure is applied to a lock-up apparatus in the above embodiment, it is similarly applicable to other power transmission apparatuses as well.

(b) The configuration of the torsion spring is not limited to the configuration in the above embodiment. It may be constituted by one arc spring. Also, although the large arc spring and the small arc spring have different coil lengths in the above embodiment, they may have the same coil length. If the large arc spring and the small arc spring have the same coil length, it is preferable to set the same radius of curvature for them.

(c) The springs that constitute the torsion spring are not limited to springs that have one radius of curvature. A spring that has a different radius of curvature in a certain portion may be used.

(d) Although the spring housing portions are formed in portions of the drive plate in the above embodiment, the member that supports the torsion springs may be a member other than the drive plate. Also, the spring housing portions may be formed in portions of the driven plate.

(e) At least one of the torsion springs may be constituted by an arc spring.

LIST OF REFERENCE NUMERALS

1 Torque converter
2 Front cover
4 Turbine
7 Lock-up apparatus
28 Clutch portion
29 Drive plate
29b Spring housing portion
291b Support surface
30 Driven plate
31 Torsion spring
55 Large arc spring
56 Small arc spring

What is claimed is:

1. A damper apparatus comprising:
   an input-side rotation member to which torque is input;
   an output-side rotation member that is rotatable relative to the input-side rotation member and that outputs torque;
   a plurality of arc springs that are arc-shaped in a free state, and elastically couple the input-side rotation member and the output-side rotation member in a rotation direction and transmit torque; and
   a support member that has a support surface configured to support an outer periphery of the plurality of arc springs, and that is arranged on an outer circumferential side of the plurality of arc springs,
   wherein an outer periphery of a central portion, in a lengthwise direction, of at least one arc spring among the plurality of arc springs comes into contact with the support surface, and gaps are formed between the support surface and an outer periphery of two end portions, in the lengthwise direction, of the at least one arc spring,
   the support surface of the support member has a first radius of curvature, and
   the outer periphery of the central portion of the at least one arc spring has a second radius of curvature which is 90% or less than the first radius of curvature.

2. The damper apparatus according to claim 1, wherein gaps between the support surface of the support member and an outer periphery of at least one arc spring that partially comes into contact with the support surface are widest at two ends in the lengthwise direction, and become increasingly narrow toward a center in the lengthwise direction.

3. The damper apparatus according to claim 1, wherein the support member is formed on an outer circumferential portion of the input-side rotation member or the output-side rotation member, and is integrated with the input-side rotation member or the output-side rotation member.

4. The damper apparatus according to claim 1, wherein the plurality of arc springs each have a first spring and a second spring that is housed inside the first spring.

5. The damper apparatus according to claim 4,
   wherein the support member is ring-shaped and has housing portions that have a C-shaped cross-section and house the plurality of arc springs,
   the first springs have a first coil length, and
   the second springs have a second coil length that is shorter than the first coil length, and have the same radius of curvature as the housing portions of the support member.

6. A lock-up apparatus in a torque converter that is arranged between a front cover to which torque from an engine is input and a turbine that outputs torque to a transmission, the lock-up apparatus comprising:
   a clutch portion to which torque is input from the front cover; and
   the damper apparatus according to claim 1 is arranged between the clutch portion and the turbine.

7. A damper apparatus comprising:
   an input-side rotation member to which torque is input;
   an output-side rotation member that is rotatable relative to the input-side rotation member and that outputs torque;
   a plurality of arc springs that are arc-shaped in a free state, and elastically couple the input-side rotation member and the output-side rotation member in a rotation direction and transmit torque; and
   a support member that has a support surface configured to support an outer periphery of the plurality of arc springs, and that is arranged on an outer circumferential side of the plurality of arc springs,
   wherein the support surface of the support member has a first radius of curvature, and
   an outer periphery of at least one arc spring that partially comes into contact with the support surface has a second radius of curvature which is 90% or less than the first radius of curvature.

8. The damper apparatus according to claim 7, wherein gaps between the support surface of the support member and an outer periphery of at least one arc spring that partially comes into contact with the support surface are widest at two ends in the lengthwise direction, and become increasingly narrow toward a center in the lengthwise direction.

9. The damper apparatus according to claim 7, wherein the support member is formed on an outer circumferential portion of the input-side rotation member or the output-side rotation member, and is integrated with the input-side rotation member or the output-side rotation member.

10. The damper apparatus according to claim 7, wherein the plurality of arc springs each have a first spring and a second spring that is housed inside the first spring.

11. The damper apparatus according to claim 10,
    wherein the support member is ring-shaped and has housing portions that have a C-shaped cross-section and house the plurality of arc springs,
    the first springs have a first coil length, and
    the second springs have a second coil length that is shorter than the first coil length, and have the same radius of curvature as the housing portions of the support member.

12. A lock-up apparatus in a torque converter that is arranged between a front cover to which torque from an engine is input and a turbine that outputs torque to a transmission, the lock-up apparatus comprising:
    a clutch portion to which torque is input from the front cover; and
    the damper apparatus according to claim 7 is arranged between the clutch portion and the turbine.

* * * * *